United States Patent [19]

Gast

[11] Patent Number: 4,635,319
[45] Date of Patent: Jan. 13, 1987

[54] SKINNING DEVICE

[76] Inventor: Daniel A. Gast, 4419 Trail Lake, Houston, Tex. 77045

[21] Appl. No.: 791,415

[22] Filed: Oct. 25, 1985

[51] Int. Cl.[4] .............................................. A22C 25/06
[52] U.S. Cl. ........................................... 17/68; 17/70
[58] Field of Search .................... 17/21, 50, 68, 69, 70; 81/418, 420, 424.5

[56] References Cited

U.S. PATENT DOCUMENTS

| | | | |
|---|---|---|---|
| D. 161,405 | 1/1951 | Achenbach | 17/70 X |
| 716,082 | 12/1902 | McKinly | 17/70 X |
| 1,949,452 | 3/1934 | Chadwick | 81/424.5 X |
| 1,960,643 | 5/1934 | Lorenzen | 17/21 |
| 2,757,951 | 8/1956 | Benton | 17/70 X |
| 3,163,885 | 1/1965 | Dumas et al. | 17/68 |
| 3,169,034 | 2/1965 | Epstein | 81/420 |

FOREIGN PATENT DOCUMENTS

| | | | |
|---|---|---|---|
| 481428 | 8/1929 | Fed. Rep. of Germany | 17/21 |
| 55217 | 5/1935 | Norway | 17/68 |

Primary Examiner—Willie G. Abercrombie
Attorney, Agent, or Firm—Guy E. Matthews

[57] ABSTRACT

An animal skinning device including opposing sets of pointed skin grasping teeth mounted in teeth carrier members mounted at the ends of elongated jaw members. Jaw members are connected through a pivot to move from an open position into a forceful biting position. Handles are mounted at the ends of handle members with said handle members joined with said jaw members at pivot. Teeth and handles are spaced a selected distance apart by a stop means mounted between handle members. Points of teeth are formed to define a prescribed radius and teeth are mounted in carrier members a prescribed distance apart. Handles are formed as closed loops.

17 Claims, 5 Drawing Figures

SKINNING DEVICE

FIELD OF THE INVENTION

This invention generally relates to the skinning or flaying of animals and more particularly pertains to an easily handled device for skinning game animals such as deer, pigs, elk, antelope and the like.

BACKGROUND OF THE INVENTION

Most game heretofore has been skinned by hand with one hand pulling on the skin or pelt and the other hand cutting the skin loose as need be with a skinning knife. When conditions permit, of course, the skinning process is initiated with a skinning knife, then both hands are used to pull the skin loose from the animal until a skinning knife is again needed to part tissue in some instances. Common hand pliers have been used to pull skin loose from animals during the skinning process.

No particular tool such as the invention disclosed herein has been developed or has been available for skinning game.

Presently known patents relevant to this device are as follows:

U.S. Pat. Nos. 4,317,257 to Engel, 2,972,270 to Krolick, 3,169,034 to Epstein, and 1,960,643 to Lorenzen.

OBJECTS OF THE INVENTION

A principal object of the invention is to provide a skinning device which is effective in the removal of the skin from game animals.

Another object of the invention is to provide a skinning device or tool which is inexpensive, readily portable, rugged, and simple to operate by persons normally accustomed to skinning animals by hand.

SUMMARY OF THE INVENTION

The above and other objects and advantages of the invention is attained by a hand operated animal skinning device having opposing sets of pointed skin grasping teeth mounted in teeth carrier members with the carrier members being respectively mounted at the ends of elongated jaw members. The jaw members are connected together through a pivot and adapted for pivotal movement from an open position into a forceful biting position of the teeth into the skin of an animal wherein the points of the teeth are embedded into the skin without piercing or damaging the skin. A pair of handles are respectively mounted at the ends of elongated handle members with the handle members being respectively joined with the jaw members at the pivot. The handle members are adapted to drive the jaw members into biting position when forced together about the pivot by hand operation whereby the skin can be gripped and pulled away from the animal. The teeth and the handles are spaced a selected distance apart by stops mounted between the handle members. The points of the teeth are formed to define a prescribed radius. The teeth are mounted in the carrier members a prescribed distance apart. The handles are formed as closed loops respectively connected to the handle members. The device is made up of two unitary members connected in pivoted relationship with each unitary member including one each of the teeth carrier members, the jaw members, the handle members, the handles and the stops. The unitary members are optionally formed as castings or forgings. The unitary members are optionally formed of cast iron, cast steel, malleable iron, aluminum, brass or bronze.

DESCRIPTION OF THE PREFERRED EMBODIMENT

Figure 1:
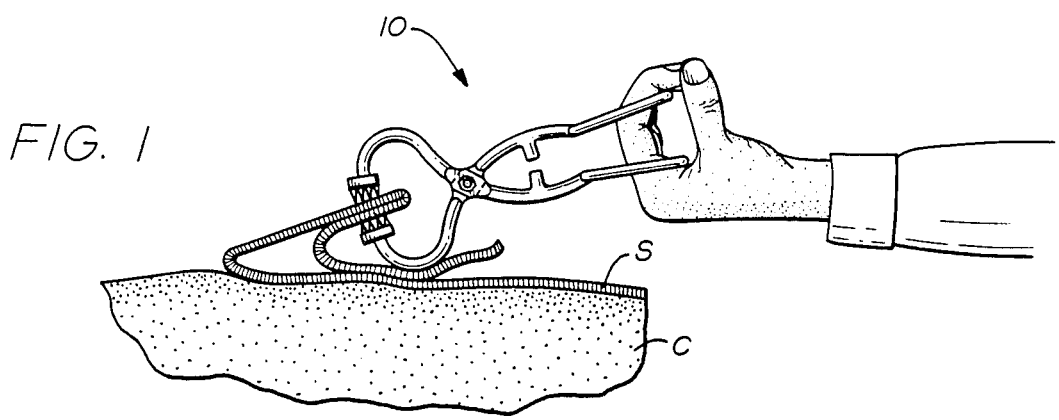
FIG. 1 illustrates the use of the present invention by a human operator while removing the skin from an animal.

Referring first to FIG. 1, there is shown a human operator utilizing the skinning device 10 of the present invention pulling on the skin S of an animal to remove the skin from a animal carcass C.

Figure 4:
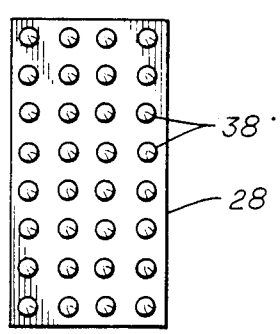
FIG. 4 is a section taken along the line 4—4 in FIG. 2 and showing the teeth carrier member and the spacing of the gripping or biting teeth.

The size of the skinning device 10 may vary with relation to the size of the animal to be skinned. As an example, the overall length of device 10 may be about ten inches (10") with the dimension of teeth carrier plate 28, as shown in FIG. 4, being about one inch (1") in width and two inches (2") in length.

Figure 2:
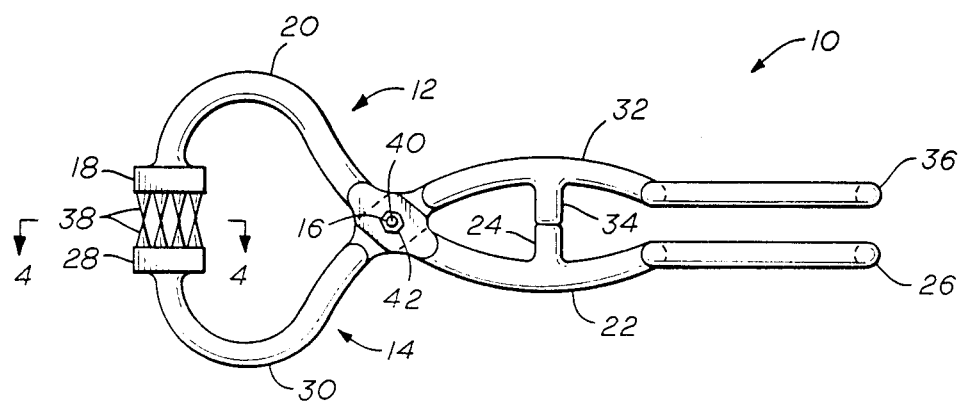
FIG. 2 is a side elevation of the tool such as shown in FIG. 1.

As shown in FIG. 2, the skinning device 10 is shown to comprise a first unitary member 12 and a second unitary member 14 connected in pivoted relationship by a pivot assembly 16.

The unitary member 12 includes a teeth carrier plate 18, an arcuate jaw member 20, a handle member 22 which supports a stop lug 24, and a handle loop 26 as shown.

The unitary member 14 includes a teeth carrier plate 28, an arcuate jaw member 30, a handle member 32 which supports a stop lug 34, and a handle loop 36. Both the teeth carrier plates 18 and 28 support a plurality of pointed teeth 38 as shown.

The unitary member 12 and the unitary member 14, as shown, are alike to the extent that the same mold or die can be used in their manufacture.

Figure 3:
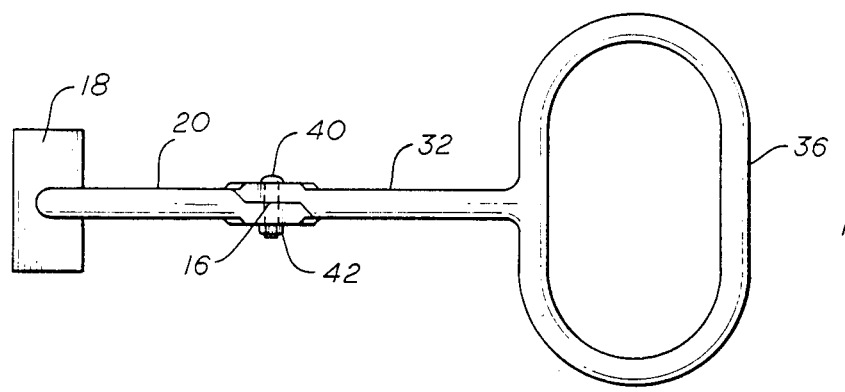
FIG. 3 is a plan view of the device looking down from above the device as shown in FIG. 2.

As thus shown in FIGS. 2 and 3, the pivot assembly 16 is seen to comprise holes defined at the junctures of the arcuate jaw members 20 and 30 and the handle members 22 and 32 through which is installed a pivot pin 40.

The pivot pin 40 can have a O.D. of about one-fourth inch (¼"), in the size of skinning device 10 as mentioned above, and can be a rivet (not shown) or a shouldered and threaded bolt as shown which is passed through the first unitary 12 and threaded through the unitary member 14 by threaded connection and locked into place with a threaded locknut 42.

The purpose of stop lugs 24 and 34 is to maintain a minimum distance between the handle loops 26 and 36, and also to maintain a minimum spacing between opposing sets of the teeth 38. Referring to FIG. 4, there is shown a plan view of the teeth carrier plate 28 in which are mounted a plurality of the teeth 38, for example, a symmetrical array of 32 teeth, as shown. The opposing set of teeth 38 disposed in the teeth carrier plate 18, are also symmetrical and disposed in mirror image to the teeth in plate 28, such that each tooth 38 in plate 38 is opposed point-to-point with an opposing tooth 38 disposed in the carrier plate 18.

Figure 5:
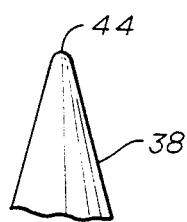
FIG. 5 is an enlarged view of the segment of one of the teeth shown in FIGS. 1 and 2.

An enlarged segment of a typical tooth 38 is shown in FIG. 5. While each tooth 38 terminates in a point 44, such point is slightly rounded to reduce any tendency to penetrate or tear the skin S while it is biting into the skin S. An effective surface area of each tooth 38 and the total of the opposing sets of teeth 38 is provided by a radius defined to round each point. Such a radius may be 1/32 of an inch, for example.

The teeth 38 may be cast or molded as an integral part of the respective teeth carrier plates 18 and 28 or, alternately, the teeth carrier plates 18 and 28 may be provided with holes to receive such teeth and the teeth later inserted as part of the assembly of the skinning device 10.

The handle loops 26 and 36 are provided as shown to permit the device to be handled with both hands or with only one hand during the skinning procedure. The operator can grip both the handle loops 26 and 36 with one hand to effect both a gripping operation and pulling during flaying of the animal while the other hand is engaged in cutting connective tissue as necessary with a skinning knife.

The unitary members 12 and 14 may be formed optionally as castings, either mold or die castings, or as forgings. The unitary members 12 and 14 may be provided of several materials which can be suitable such as aluminum alloy, brass, bronze, cast iron, malleable iron, or cast steel. The preferred materials, from the viewpoint of costs, castability and serviceability, is cast iron or malleable iron with the teeth 38 cast as an integral part of the teeth carrier plates 18 and 28. In such case, a small hand operated forming tool (not shown), may be used to dress or shape each point 44 of each tooth 38 with a prescribed radius as shown in FIG. 5.

Alternately, the teeth 38 may be machined of suitable material, such as carbon steel, and machined through an automatic screw machine. The machined teeth can than be inserted as by pressing into sockets formed in the carrier plates 18 and 28.

It is to be noted that the embodiment of the invention as illustrated and described herein, may be modified in various ways, all without departing from the spirit of the invention as defined in the appended claims.

What is claimed is:

1. A hand operated animal skinning device, comprising:
   (a) plural rows of opposing sets of pointed skin grasping teeth mounted for possible point-to-point contact in teeth carrier members with said carrier members being respectively mounted at the ends of elongated arcuately shaped jaw members;
   (b) said jaw members being connected together through pivot means and adapted for pivotal movement from an open position into a forceful biting position of all of said teeth against the skin of an animal;
   (c) a pair of handles respectively mounted at the ends of elongated handle members with said handle members being respectively joined with said jaw members at said pivot means; and
   (d) said handle members being operative to drive said jaw members into biting position when forced together about said pivot means by one hand operation.

2. The device of claim 1 wherein said teeth and said handles are spaced a selected distance apart by stop means mounted between said handle members.

3. The device of claim 1 wherein each point of said points of said teeth is formed to define a prescribed radius.

4. The device of claim 1 wherein said teeth are mounted in said carrier members a prescribed distance apart.

5. The device of claim 1 wherein said handles are formed as closed loops respectively connected to said handle members.

6. The device of claim 1 wherein said device comprises two unitary members connected in pivoted relationship with each said unitary member including one each of: said teeth carrier members, said jaw members, said handle members, said handles and stop members.

7. The device of claim 6 wherein said unitary members are alike.

8. The device of claim 7 wherein said unitary members are optionally formed of cast iron, cast steel, malleable iron, aluminum, brass or bronze.

9. The device of claim 7 wherein said teeth are formed integrally with said teeth carrier members.

10. The device of claim 3 wherein said teeth are mounted in said carrier members a prescribed distance apart.

11. The device of claim 10 wherein said device comprises two unitary members connected in pivoted relationship with each said unitary member including one each of: said teeth carrier members, said jaw members, said handle members, said handles and stop members.

12. The device of claim 10 wherein said teeth are formed integrally with said teeth carrier members.

13. The device of claim 11 wherein said teeth are formed integrally with said teeth carrier members.

14. The device of claim 4 wherein said teeth and said handles are spaced a selected distance apart by stop means mounted between said handle members.

15. The device of claim 6 wherein said unitary members are optionally formed of aluminum, cast iron, cast steel, malleable iron, brass or bronze.

16. The device of claim 14 wherein said unitary members are optionally formed of aluminum, cast iron, cast steel, malleable iron, brass or bronze.

17. The device of claim 10 wherein said teeth and said handles are spaced a selected distance apart by stop means mounted between said handle members.

* * * * *